United States Patent [19]

Shea

[11] 4,025,435
[45] May 24, 1977

[54] PAINT FILTERING APPARATUS

[76] Inventor: Dennis Owen Shea, 101 Carmel, No. 1, San Francisco, Calif. 94117

[22] Filed: July 25, 1975

[21] Appl. No.: 599,319

[52] U.S. Cl. .............................. 210/250; 210/469; 248/94
[51] Int. Cl.² ........................................ B01D 35/28
[58] Field of Search ... 210/473, 474, 250, 476–480, 210/DIG. 12, 451, 464, 469, 241; 248/94, 163

[56] References Cited

UNITED STATES PATENTS

| | | | |
|---|---|---|---|
| 911,583 | 2/1909 | Focht | 248/94 X |
| 934,937 | 9/1909 | Schaubel | 248/94 X |
| 1,317,027 | 9/1919 | McLeod | 248/94 |
| 1,424,387 | 8/1922 | Wills | 248/94 |
| 1,509,593 | 9/1924 | Felger | 248/94 |
| 1,786,500 | 12/1930 | McGonigal | 210/474 |
| 1,874,498 | 8/1932 | Glenny | 248/94 |
| 2,060,392 | 11/1936 | Franzmeier | 210/474 X |
| 2,315,842 | 4/1943 | Dariano | 210/474 |
| 2,673,636 | 3/1954 | Vermette | 248/163 X |
| 2,883,057 | 4/1959 | Richards | 210/476 |

FOREIGN PATENTS OR APPLICATIONS 738,310  12/1932  France .................... 210/473

*Primary Examiner*—Frank W. Lutter
*Assistant Examiner*—Richard L. Chiesa
*Attorney, Agent, or Firm*—Robert Charles Hill

[57] ABSTRACT

Paint filtering apparatus for supporting a filter medium, such as foraminous cloth or the like, above a paint pail. The apparatus includes an impervious plate larger than the mouth of the paint pail and legs for supporting the plate above a surface on which the paint pail can be rested. The plate defines a circular opening having a diameter smaller than the diameter of the mouth of the paint pail. A cylindric rim that is sized to fit within the hole in the plate and having protrusions fastened thereto for bearing on the plate to retain the rim in place. Above the protrusions the rim defines an annular groove, and there is a strap that can be placed in the groove to retain the filter medium within the groove throughout the extent thereof. The rim is smaller than the diameter of a paint bucket so that a paint bucket can be rested on the rim in an inverted position to afford draining of the same without continuing attention.

8 Claims, 4 Drawing Figures

PAINT FILTERING APPARATUS

BACKGROUND OF THE INVENTION

1. Field of the Invention

This invention relates to paint filtering apparatus and more particularly to such apparatus that can be conveniently moved about a job site and achieve efficient filtering of paint without undue attention and without substantial risk of spillage.

2. Description of the Prior Art

It has been customary in filtering paint heretofore to line an empty paint pail with cheesecloth or like filtering medium and then pour paint into the pail. Thereafter the cloth filtering medium is lifted up through the paint so as to entrap with it any solids. To avoid wastage it is necessary for the workmen to hold the filter medium above the paint pail while the paint drips from the medium into the pail. Not only is this wasteful of manpower but it is extremely messy and frequently causes paint spillage.

U.S. Pat. No. 911,583 discloses a cloth support for a milk strainer in the form of a ring that can be engaged around the mouth of a bucket to secure a cloth filter in spanning relation to the mouth. The structure is not suitable for relatively thick or viscous paint because the paint would flow through the cloth very slowly necessitating a man lifting a paint bucket and very carefully pouring it through the cloth, a difficult task particularly when five gallon paint buckets are employed.

U.S. Pat. No. 934,937 discloses a conical screen supported on a stand for use in pressing and straining fruit. Not only is metal screeen wire unsatisfactory for paint filtering but the device described in the patent does not have sufficient clearance beneath it to accommodate a paint pail.

U.S. Pat. No. 1,317,027 discloses a device for supporting a strainer bag over a cooking pot. Becuase the device relies on the cooking pot for its support, the pot cannot be moved unless and until the strainer device is removed.

U.S. Pat. No. 1,424,387 discloses a holder for a bag strainer of the type used in making jelly. The disclosed device supports a bag over a horizontal surface but affords no impervious plate around the bag for preventing spillage of unfiltered material into the container supported below the bag.

U.S. Pat. No. 2,883,057 discloses a paint strainer which is supported on a paint bucket. The patented device, because it relies on the paint pail for support, must be removed before the pail and its contents can be moved about the job site.

SUMMARY OF THE INVENTION

It is an object of the present invention to provide paint filtering apparatus which virtually prohibits inadvertent entry of unfiltered paint into a pail of filtered paint. This object is achieved according to the present invention by providing an impervious plate which has length and width dimensions in excess of the diameter of the paint pail disposed thereunder. Centrally of the plate is an opening for the filter medium and the support therefor. If by inadvertence the paint is not poured through the filter medium, it is caught on the plate and either retained there or deflected outward of the mouth of the paint container.

Another object of the present invention is to provide a paint filtering apparatus on which a paint bucket can be supported in an inverted position without attention of a workman. Achievement of this object permits the workman to place the paint bucket on the apparatus and then attend to other duties while the paint runs from the bucket and drips into the filter. This object is achieved by providing a rigid rim on which the filter medium is supported which rim has a diameter less than the diameter of the paint bucket.

A further object of the invention is to provide paint filtering apparatus wherein the filter medium can be quickly installed and replaced as needed. This object is achieved because the above mentioned rim is separable from the plate and has a quick acting toggle strap for retaining the filter medium in the rim throughout its periphery.

Still another object is to provide a paint filtering apparatus that expedites the paint filtering procedure without requiring excessive exertion by the user of the device. This object is achieved because the present inventon includes rigid legs for supporting the plate at a convenient height above the floor surface so that the paint can be dumped through the filter medium without requiring the workman to assume a strained position. The legs are sufficiently long that the medium is supported totally above the paint pail so as to permit the paint to drip through the filter without the necessity of lifting and/or holding the filter or paint bucket in an elevated, strained position.

Yet a further object is to provide a paint filter apparatus that is readily portable for movement between jobs. This object is achieved by removably mounting the above mentioned legs to the plate so that the legs can be quickly removed during transport of the apparatus between jobs.

The foregoing together with other objects, features and advantages will be more apparent after referring to the following specification and the accompanying drawing.

DESCRIPTION OF THE PREFERRED EMBODIMENT

Figure 3:
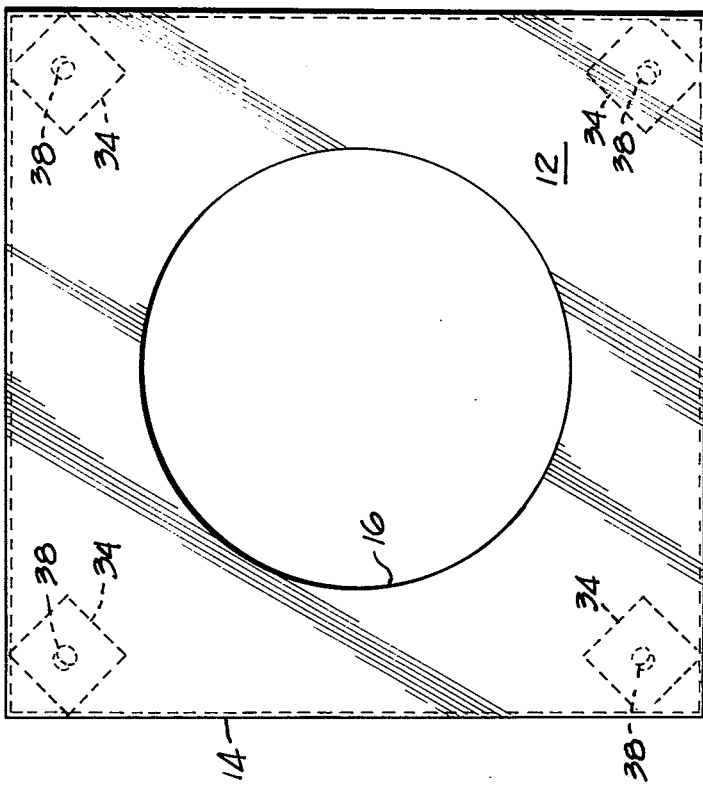
FIG. 3 is a plan view of the plate that forms a part of the invention.
Figure 4:
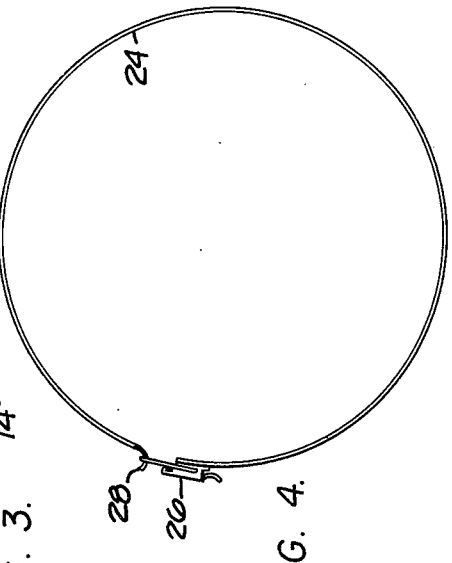
FIG. 4 is a plan view of a toggle ring employed for retaining the filter medium in place during use of the apparatus.

Referring more particularly to the drawing reference numeral 12 indicates an impervious plate, such as 18 gauge steel. For rigidity plate 12 has integral side walls 14 therearound. In the embodiment exemplified in the drawings, plate 12 is of square shape having length and width dimensions in excess of the diameter of a conventional paint pail P so that paint spilled on the top surface of the plate will either remain on the plate or run off the sides of the plate and not into the paint pail. Centrally of plate 12 is formed a circular opening 16.

Opening 16 has a diameter slightly less than the diameter of the mouth of paint pail P for reasons which will appear. There is a rigid cylindric rim 18 which can be formed of the same material as plate 12 is formed. Cylindric rim 18 has an outer diameter slightly smaller than opening 16 so that the rim can fit in the opening but will not define a significant gap between the outer surface of the rim and the portion of plate 12 that defines hole 16. In one device designed according to the present invention, the outer diameter of rim 18 is approximately 0.080 inch less than the diameter of opening 16. The 0.080 inch gap affords ready insertion of the rim into the opening but does not create a gap of sufficient size to permit substantial paint to flow therethrough. For supporting the rim on plate 12 there are four uniformly spaced protrusions 20 which bear on the upper surface of plate 12 and support rim 18 with a portion thereof extending above the surface of plate 12 and a portion extending below the surface of plate 12. Protrusions 20 can be formed as angles having a vertical leg welded to the exterior surface of rim 18 and horizontal legs protruding radially outward to bear on the upper surface of plate 12.

Figure 1:
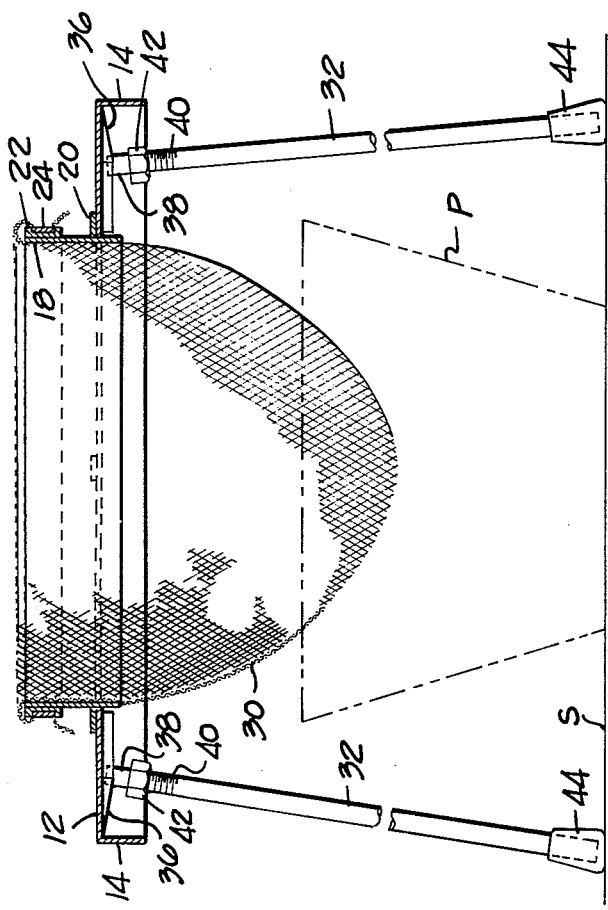
FIG. 1 is a side elevation view of a paint filtering apparatus of the invention.
Figure 2:
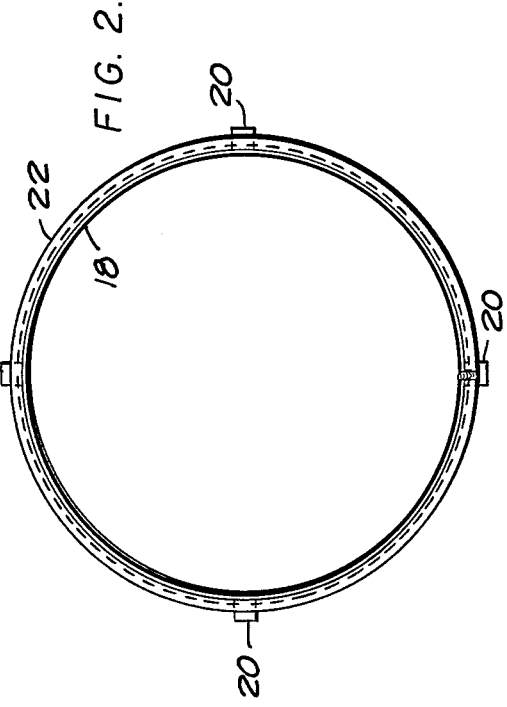
FIG. 2 is a plan view of the rim that constitutes a part of the invention.

FIxed to the outer surface at the upper extremity of rim 18 is a U-shaped flange 22 which defines an outward open groove throughout the periphery of the rim. For entry into the groove defined by flange 22 there is a strap 24 that can be constructed of spring steel or the like. Strap 24, as seen in FIG. 1, has an axial extent such as to fit snugly within the groove. For affording insertion and removal of the strap into the groove in flange 12 the strap includes a toggle latch 26 which cooperates with a hook 28 formed in the strap to tension the strap when the toggle latch is engaged and to release the strap when the toggle latch is disengaged.

A cloth filter medium 30 is supported on rim 18 by engagement of the upper edge of the filter medium into the groove defined in flange 22 over which strap 24 is installed. Filter medium 30 is any suitable fabric material that combines the necessary strength with the filtering capability suitable for paint filtering.

Plate 12 is supported in spaced parallel relation above a surface S, such as a floor, by means of four legs 32. For removably fixing the legs to plate 12 the lower surface of the plate has fixed near the corners thereof angle mounting plates 34 which form respective outward inclined surfaces 36. The angle of inclination is such that the lower extremity of the legs will extend outward of the corners of plate 12 so as to render the device immune to tipping. Welded to the respective mounting plates 34 are internally threaded members 38 which are perpendicular to surface 36 so that the appropriate inclinatin of the legs is achieved. The upper ends of legs 32 are formed with externally threaded portions 40, and there are correspondingly threaded nuts 42 which can be engaged with threaded portions 40 to retain the legs firmly in place. When removal of the legs is desired, it is a simple matter to loosen nuts 42 to permit separation of the legs from plate 12 so that the device can be transported in a flat compact condition. The lower extemities of legs 32 can be supplied with resilient tips 44 which prevent the apparatus from sliding on surface S.

The operation of the apparatus of the invention is as follows. When the apparatus is carried onto a job, the threaded portions 40 of legs 32 are screwed into members 38 and the nuts 42 threaded onto portion 40 and over member 38 to prevent accidental disengagement. With the legs so installed, plate 12 is extremely stable and is spaced above surface S by an amount in excess of the height of a paint pail P. Next a piece of filter medium 30 is secured to rim 18 by first removing strap 24, placing the periphery of the filter medium into the groove defined in flange 22, wrapping the strap around the exterior of the fabric within the groove, and then by engaging toggle latch 26 with hook 28 and operating toggle latch to tension the strap. The filter medium is thus firmly retained within rim 18. As indicated in FIG. 1, it is preferable that sufficient filter material 30 be provided so that there is a substantial portion of the filter material depending below plate 12. Next rim 18, with filter medium 30 attached as described above, is inserted into opening 16. Engagement of the horizontal of protrusions 20 on the upper surface of plate 12 retains rim 18 and filter medium 20 in operative position. Because of the gap between the outer diameter of the rim and the inner diameter of hole 16, the rim can be readily installed. The gap, however, is not so large as to permit substantial movement of the rim or to permit passage of paint though the gap, should paint be inadvertently spilled on the upper surface of plate 12.

Next pail P is placed on surface S in vertical alignment below filter medium 30 and the opening defined by rim 18. Paint is then poured through the center of the rim into filter medium 30. Because legs 32 support plate 12 at a substantial height above surface S, the workman can pour the paint through the filter without assuming a strained condition even in the case of five gallon paint buckets which are quite heavy. The substantial portion of filter 30 below plate 12 affords rapid passage of the paint therethrough into pail P. However, because opening 16 and the inner diameter of rim 18 are less than the diameter of paint pail P, there is virtually no chance that the paint will drip onto the floor. The inner diameter of rim 18 is selected so as to be slightly smaller than the diameter of a conventional 5 gallon paint bucket so that after most of the paint is poured out of the bucket, the bucket can be supported on the rim in an inverted position to permit the paint to rum from the can into the filter without continuing attention of a workman. An inner diameter for rim 18 of about 10 inches was found suitable in one device designed according to the invention for achieving this advantageous mode of operation.

Should paint be inadvertently spilled on the upper surface of plate 12, the paint will not contaminate the filtered paint residing in pail P. This is because the extent of the plate is greater than the mouth of pail P and because the minimal gap between rim 18 and opening 16 is not sufficient to permit substantial paint to drip through the gap.

Because rim 18 is removable from plate 12 and is of relatively light weight, it can be washed out or soaked between filtering operations so that it can be reused many times. On completion of a given job the filter can be quickly removed by disengaging toggle latch 26 and removing strap 24. The filter material 30 can be discarded and the remaining parts, because they are separable, can be thoroughly cleaned to ready the apparatus for any subsequent usage.

Comprehended within the invention is the provision of legs 32 that can be telescoped so as to afford adjustability of length. Thus the device can be adapted for different heights and different working environments. In addition the plate 12 can be suspended from a ceiling so as to leave the area therebelow totally clear of even legs 32. Although the structure has been described in the exemplary embodiment as being constructed of metal, there are various thermoplastic materials of suitable strength and weight that can be employed in constructing the apparatus.

Thus it will be seen that the present invention provides a paint filtering apparatus that is portable for convenient movement from job to job and which materially expedits the filtering of paint without requiring exertion on the part of the persons using the device. Finally the device is arranged such as virtually to eliminate any possibility of unfiltered paint entering by inadvertence into a pail of filtered paint.

Although one embodiment has been shown and described, it will be obvious that other adaptations and modifications can be made without departing from the true spirit and scope of the invention.

What is claimed is:

1. Apparatus for filtering paint comprising: a pail having a given diameter and a given height, a rigid impervious plate having length and width dimensions exceeding the given diameter, means for supporting said plate in parallel relation above a surface by a distance in excess of the given height, a central portion of said plate defining a circular opening having a diameter less than the given diameter and positioned directly above said pail, a generally cylindric rim having an outer diameter sized for entry into said opening, means protruding radially outward of said rim for bearing on said plate to retain said rim within said opening, said rim definging an exteriorly open annular groove therearound above said bearing means, a strap sized for entry in said groove, and means for tensioning said strip to retain the strap in said groove so as to retain a filter medium therein throughout the periphery thereof, said rim being smaller than the diameter of a paint bucket whereby said bucket can be rested on said rim in an inverted position.

2. Paint filtering apparatus according to claim 1 wherein said plate supporting means include a plurality of rigid legs and means for removably securing said legs to the lower surface of said plate.

3. Paint filtering apparatus according to claim 2 wherein said leg attaching means comprise a threaded stud fixed to the lower surface of said plate and inclined outwardy, a similarly threaded portion on the upper extremity of the leg, and a threaded nut for engaging said threaded leg portion.

4. Paint filtering apparatus according to claim 1 wherein said cylindric rim has an axial extent sufficient to extend above and below said plate and wherein said bearing means are located axially so that said groove is above said plate.

5. Paint filtering apparatus according to claim 1 wherein said strap has a hook at one end thereof and wherein said tensioning means includes a toggle latch engageable with said hook for securing said strap into said groove.

6. Paint filtering apparatus according to claim 1 wherein said rim has a diameter less than said opening to form a small gap therebetween.

7. Paint filtering apparatus according to claim 6 wherein said gap is in the range of about 0.080 inches.

8. Paint filtering apparatus according to claim 1 wherein said bearing means include four angle members uniformly spaced about said rim and having horizontal legs for bearing on said plate.

* * * * *